United States Patent [19]
Osborne

[11] Patent Number: 4,932,801
[45] Date of Patent: Jun. 12, 1990

[54] PIPE DOPE APPLICATOR APPARATUS

[76] Inventor: Michael E. Osborne, 8440 NE. 138th St., Kirkland, Wash. 98034

[21] Appl. No.: 329,614

[22] Filed: Mar. 28, 1989

[51] Int. Cl.⁵ ............................................. B05C 3/20
[52] U.S. Cl. ..................... 401/11; 118/428; 401/176; 401/265; 222/386; 156/578; 156/293
[58] Field of Search ............... 401/6, 7, 9, 261, 265, 401/26, 176, 178, 171, 11; 118/428, DIG. 11; 156/293, 578; 222/386, 526, 532, 531, 386.5, 464, 319, 405, 387

[56] References Cited

U.S. PATENT DOCUMENTS

| | | | |
|---|---|---|---|
| 1,065,823 | 6/1913 | Mathews | 222/386 |
| 1,714,482 | 5/1929 | Schmuziger | 222/386 |
| 2,263,845 | 11/1941 | Hartsell | 222/386 |
| 2,622,257 | 12/1952 | Lemonds | 401/11 |
| 2,763,405 | 9/1956 | Shvetz | 222/386 |
| 2,767,417 | 10/1956 | Amen | 15/121.2 |
| 2,810,145 | 10/1957 | Forrow | 15/121.2 |
| 3,765,983 | 10/1973 | Putzier | 156/293 |
| 4,466,452 | 8/1984 | Ferrari | 132/75 |

FOREIGN PATENT DOCUMENTS 2180744 3/1987 United Kingdom ..................... 401/9

Primary Examiner—Richard J. Johnson
Attorney, Agent, or Firm—Henderson & Sturm

[57] ABSTRACT

An applicator apparatus (10) for coating the threaded end (201) of a section of pipe (200) with pipe dope (101) contained within an open receptacle (100); wherein, the applicator apparatus (10) includes a skirt member (13) having an outer peripheral portion (14) disposed adjacent the interior walls (102) of the receptacle (100) and a metering cup member (16) operatively associated with the skirt member (13) and having apertures sidewalls (19); wherein, the apertured sidewalls allow the metered passage of the pipe dope (101) from within the receptacle (100) onto the threaded end (201) of a pipe (200).

5 Claims, 1 Drawing Sheet

PIPE DOPE APPLICATOR APPARATUS

TECHNICAL FIELD

This invention relates generally to applicator devices, and in particular to an applicator for applying a lubricating material to the threads of a pipe.

BACKGROUND OF THE INVENTION

This invention was the subject matter of Document Disclosure Program registration number 190091 which was filed in the U.S. Patent and Trademark Office on Apr. 4, 1988.

As can be seen by reference to the following U.S. Pat. No's: 4,466,452; 3,765,983; 2,810,145; and, 2,767,417 the prior art is replete with myriad and diverse liquid applicators.

While the prior art constructions are more than adequate for the purpose and function for which they were specifically designed, these prior art lubricators are in most instances not suitable for applying a lubricant coating to the nipples of a pipe; and in those instances wherein the applicator is specifically designed to perform that particular function the resultant construction is unduly complex.

For instance, most of the aforementioned prior art devices are designed for applying relatively non-viscous liquids; and these constructions are usually inefficient at best when confronted with extremely thick, non-free flowing material.

In addition, none of the prior art constructions provide an effective means to apply pipe dope or lubricant to the threads of an ordinary hand manipulable pipe in a manner that will efficiently guarantee sealing after connecting.

Furthermore, one of the most common methods of applying pipe dope in the trade today comprises a receptacle having a brush applicator which is intended to be used in the same manner as a paint brush to effect the coating of the pipe dope onto the ends of sections of pipe. Not only does this particular arrangement produce a non-uniform coating but it is also wasteful of manpower in terms of time and effort to complete what ideally should be a fairly simple and straightforward task.

Obviously, there has been a longstanding need for a pipe dope lubricating applicator which facilitates the application of viscous liquids to the cylindrical threaded ends of a pipe wherein the workman can manipulate the pipe and and/or the applicator to quickly and uniformly coat the necessary surface area prior to joining sections of pipe together.

SUMMARY OF THE INVENTION

Briefly stated, the pipe dope applicator apparatus that forms the basis of the present invention was developed to control and meter the application of a viscous lubricant such as pipe dope from an open receptacle containing the lubricant onto the threaded end of a pipe.

The pipe dope applicator comprises in general: a skirt unit and a metering cup unit wherein the outer periphery of the skirt unit is dimensioned to sealingly engage the internal periphery of the walls of the pipe dope receptacle. In addition, the skirt unit comprises a generally concave skirt member having an enlarged central aperture formed therein; wherein, the central aperture is dimensioned to receive the metering cup unit.

The metering cup unit comprises a metering cup member having a lip portion which is sealingly engaged with the central aperture in the skirt unit; wherein the sides of the cup member are provided with a plurality of elongated metering apertures which are in open communication with the viscous liquid that is contained in the pipe dope receptacle.

As will be explained in greater detail further on in the specification, when a plumber or a workman wishes to apply pipe dope to the end of a threaded pipe all that is necessary is for the individual to insert the end of the pipe into the mouth of the metering cup and push gently against the bottom of the metering cup while rotating the pipe end relative to the metering cup.

Once the pipe end contacts the bottom of the metering cup both the metering cup and the skirt member will be forced downwardly into the viscous liquid or pipe dope thereby forcing the pipe dope through the metering apertures and onto the external periphery of the threaded pipe. Then as the pipe end is rotated relative to the metering cup a generally uniform coating of pipe dope will be deposited on the pipe threads.

BRIEF DESCRIPTION OF THE DRAWINGS

These and other objects, advantages, and novel features of the invention will become apparent from the detailed description of the best mode for carrying out the preferred embodiment of the drawings which follows; particularly when considered in conjunction with the accompanying drawings, wherein.

BEST MODE FOR CARRYING OUT THE INVENTION

Figure 1:
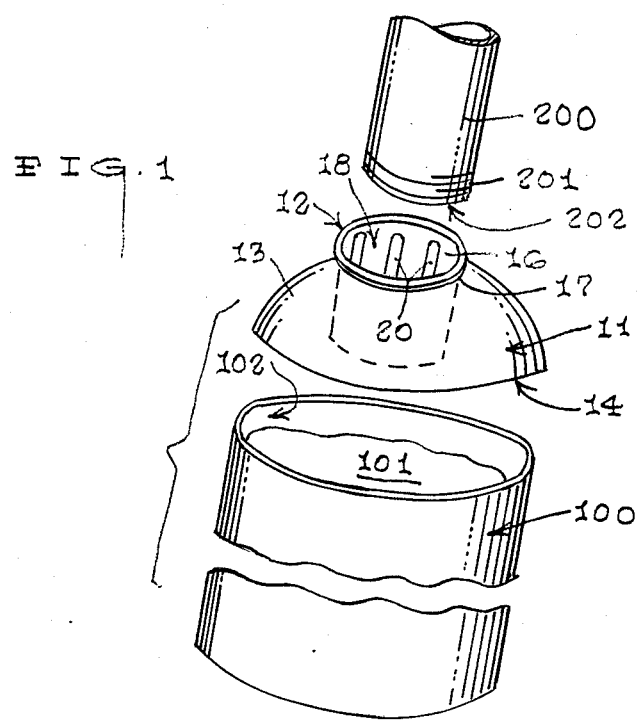
FIG. 1 is an exploded perspective view of the apparatus employed in its intended environment.

As can be seen by reference to the drawings and in particular to FIG. 1, the pipe dope applicator apparatus that forms the basis of the present invention is designated generally by the reference numeral (10) and is intended for use in combination with a receptacle (100) containing a quantity of pipe dope or viscous lubricant (101) for applying a generally uniform coating of pipe dope to the threaded end (201) of a section of pipe (200).

The pipe dope applicator apparatus (10) comprises in general: an outer skirt unit (11) and an inner metering cup unit (12). These units will now be described in seriatim fashion.

Figure 2:
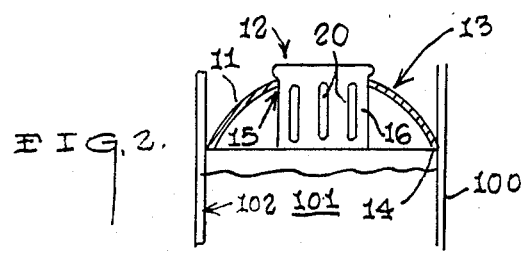
FIG. 2 is a cross-sectional view of the apparatus disposed within a pipe dope receptacle.
Figure 3:
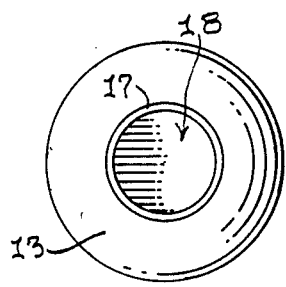
FIG. 3 is an isolated bottom plan view of the apparatus.
Figure 4:
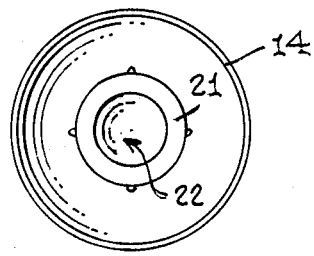
FIG. 4 is an isolated top plan view of the apparatus.

As shown in FIGS. 1 and 2, the outer skirt unit comprises a generally concave skirt member (13) having an outer peripheral portion (14) which is dimensioned to closely approximate the internal circumference of the pipe dope receptacle (100); and, an enlarged central aperture (15) which is dimensioned to receive the inner metering cup unit (12). In an alternate embodiment (not shown), the outer skirt unit comprises a generally straight skirt member.

As can be seen by reference to FIGS. 1 thru 4, the metering cup unit (12) comprises a generally cylindrical metering cup member (16) having an upper lip portion (17) which defines the mouth (18) of the metering cup member (16). In addition, the metering cup member (16) has elongated sidewalls (19) provided with a plurality of elongated spaced apertures (20) and a cup bottom (21)

optionally provided with a raised arcuate central portion (22) whose purpose and function will be described presently.

As can best be seen by reference to FIG. 2, the lip portion (17) of the metering cup member (16) is sealingly engaged with the enlarged central aperture (15) of the skirt member (13) to form the operative connection between the skirt unit (11) and the metering cup unit (12).

In operation the pipe dope applicator apparatus (10) of this invention is inserted into an open receptacle (100) containing pipe dope (101) wherein the outer peripheral portion (14) of the skirt member (13) is disposed adjacent the interior walls (102) of the receptacle (100). Then when a workman wishes to apply pipe dope (101) to the thread (201) of a pipe (200) all that is necessary is for the workman to insert the threaded end (201) of the pipe (200) into the mouth (18) of the metering cup member (16) and into engagement with the bottom (21) of the cup member (16) and gently rotating the threaded end (201) of the pipe (200) relative to the cup member (16).

As the apparatus (10) is depressed into the pipe dope (101) within the receptacle (100) the pipe dope (101) will flow through the elongated apertures (20) in the metering cup member (16) and come into contact with the pipe (200). Then as the pipe (200) is rotated relative to the cup member (16) a generally uniform coating of pipe dope (101) will be deposited on the threaded end (201) of the pipe (200) in a well recognized manner.

It should further be noted that in those instances wherein it is desired to minimize the application of pipe dope (101) to the interior of the pipe (200) the raised arcuate central portion (22) on the cup bottom (21) will form a seal at the mouth (202) of the pipe (200) when the threaded end (201) of the pipe (200) comes into contact with the bottom (21) of the metering cup member (16).

Having thereby described the subject matter of this invention it should be apparent that many substitutions, modifications and variations of the invention are possible in light of the above teachings. It is therefore to be understood that the invention as taught and described herein is only to be limited to the extent of the breadth and scope of the appended claims.

I claim:

1. A pipe dope applicator apparatus for coating the threaded end of a section of pipe with pipe dope contained in an open receptacle wherein the apparatus comprises:

a skirt unit including a skirt member having an outer peripheral portion which is disposed adjacent to the walls of said receptacle and further having an enlarged central aperture; and, a metering cup unit operatively associated with said skirt unit and including a metering cup member having a lip portion which defines the month of the metering cup member; wherein the metering cup member is further provided with a cup bottom and apertured sidewalls wherein said apertured side walls are in open fluid communication with the pipe dope contained within the receptacle.

2. The apparatus as in claim 1 wherein the skirt member is concave.

3. The apparatus as in claim 1 wherein the lip portion of the metering cup member sealingly engages the periphery of the enlarged central aperture in said skirt member.

4. The apparatus as in claim 1 wherein the apertured sidewalls of the metering cup member are provided with a plurality of elongated spaced apertures.

5. The apparatus as in claim 1 wherein said cup bottom is further provided with a raised arcuate central portion.

* * * * *